United States Patent
Kazmi et al.

(10) Patent No.: US 9,002,385 B2
(45) Date of Patent: Apr. 7, 2015

(54) METHOD AND ARRANGEMENT IN A TELECOMMUNICATION SYSTEM

(75) Inventors: Muhammad Kazmi, Bromma (SE); Robert Baldemair, Solna (SE); Magnus Lindström, Spånga (SE)

(73) Assignee: IDTP Holdings, Inc., Wilmington, DE (US)

( * ) Notice: Subject to any disclaimer, the term of this patent is extended or adjusted under 35 U.S.C. 154(b) by 635 days.

(21) Appl. No.: 12/304,640

(22) PCT Filed: Aug. 22, 2007

(86) PCT No.: PCT/EP2007/007392
§ 371 (c)(1),
(2), (4) Date: Oct. 8, 2009

(87) PCT Pub. No.: WO2008/022782
PCT Pub. Date: Feb. 28, 2008

(65) Prior Publication Data
US 2010/0222083 A1    Sep. 2, 2010

(30) Foreign Application Priority Data
Aug. 22, 2006 (SE) .................................. 0601716

(51) Int. Cl.
H04W 68/00 (2009.01)
H04W 36/00 (2009.01)
H04W 68/02 (2009.01)

(52) U.S. Cl.
CPC .................................. H04W 68/02 (2013.01)

(58) Field of Classification Search
USPC ............... 455/458, 437, 423; 370/395.4, 259
See application file for complete search history.

(56) References Cited

U.S. PATENT DOCUMENTS

| | | | |
|---|---|---|---|
| 7,194,277 B2* | 3/2007 | Farnsworth | 455/458 |
| 2003/0036384 A1* | 2/2003 | Chen et al. | 455/437 |
| 2003/0219020 A1* | 11/2003 | Honary et al. | 370/395.4 |
| 2006/0148493 A1* | 7/2006 | Narasimha et al. | 455/458 |
| 2008/0031160 A1* | 2/2008 | Ryu et al. | 370/259 |
| 2008/0220766 A1* | 9/2008 | Bertho et al. | 455/423 |
| 2009/0010219 A1* | 1/2009 | Lee et al. | 370/329 |
| 2010/0062795 A1* | 3/2010 | Lee | 455/458 |

FOREIGN PATENT DOCUMENTS

| | | |
|---|---|---|
| EP | 1515575 A | 3/2005 |
| WO | 2007/078172 A | 7/2007 |

OTHER PUBLICATIONS

International Search Report for PCT/EP2007/007392 mailed Dec. 10, 2007.

(Continued)

Primary Examiner — Jinsong Hu
Assistant Examiner — Jean Chang
(74) Attorney, Agent, or Firm — Condo Roccia Koptiw LLP

(57) ABSTRACT

There is provided a method for use in a user equipment when the user equipment is in idle mode or any other low activity state, and when the user equipment bandwidth is smaller than the cell transmission bandwidth. The method comprises the steps of determining a paging position of the user equipment in the frequency domain; receiving, from the network, paging information within the user equipment reception bandwidth; and changing, if indicated by the network, the paging position of the user equipment within the cell transmission bandwidth.

19 Claims, 3 Drawing Sheets

(56) References Cited

OTHER PUBLICATIONS

"Paging Channel Structure for E-UTRA Downlink," 3GPP TSG-RAN WG1 and WG2 Joint Meeting, R2-060837, Mar. 27-31, 2006, XP-002460378, pp. 1-5.
"Paging Mechanism in E-UTRAN," 3GPP TSG-RAN WG2 (Radio) Meeting #54, R2-062128, Aug. 28-Sep. 1, 2006, XP-002460379, pp. 1-4.

Japanese Office Action in corresponding Japanese Application No. 2009-524959 mailed Jun. 1, 2012.
Sharp; "Monitoring of Paging Information for Evolved UTRA Scalable Bandwith"; 3 GPP TSG-RAN WG1 LTE Ad-Hoc Meeting; R1-060006, Agenda Item 5.1.2.3; Jan. 23-25, 2006; pp. 1-4; Helsinki, Finland.
Sharp; "Physical Allocation of PCH for 20MHz Operating Bandwith"; 3 GPP TSG-RAN WG1 LTE Ad-Hoc; R1-061683, Agenda Item 4.4; Jun. 27-30, 2006; pp. 1-6; Cannes, France.

* cited by examiner

METHOD AND ARRANGEMENT IN A TELECOMMUNICATION SYSTEM

RELATED APPLICATIONS

This application claims priority and benefit from International Application No. PCT/EP2007/007392, filed Aug. 22, 2007, which claims priority to Swedish Patent Application No. 0601716.4, filed Aug. 22, 2006, the entire teachings of which are incorporated herein by reference.

The present invention relates to methods and arrangements in a telecommunication system, in particular to methods and arrangements for paging transmissions in variable bandwidth scenarios.

BACKGROUND

In current systems such as, e.g., the UMTS Terrestrial Radio Access Network (UTRAN) the reception bandwidth of user equipments (UEs) is the same as the cell transmission bandwidth. However, in Evolved UTRAN (E-UTRAN) the system may employ variable bandwidths. Further, the minimum bandwidth that is applied by a user equipment can be smaller than the network bandwidth. For instance, a typical case in future releases of E-UTRAN would be a 20 MHz user equipment operating in a system comprising a 30 MHz or 40 MHz cell transmission bandwidth. One additional important aspect of E-UTRAN is the potentially very large number of active and idle mode users per cell. This is partly due to the possibly large bandwidth that can be applied (10 MHz and 20 MHz cases) and partly because of the packet-oriented design. Hence, the number of paging messages per cell is envisioned to be much larger compared to previous radio access networks, e.g. the UTRAN or GERAN system, and, as a consequence, paging in E-UTRAN may consume more resources than in other systems.

In E-UTRAN, no radio resources are allocated to a user equipment in idle mode and, thus, there is no RRC connection maintained (see, e.g., the documents 3GPP TS25.304, "UE procedures in idle mode and procedures for cell reselection in connected mode" and 3GPP TS25.331, "Radio Resource Control Protocol Specifications" issued by the 3rd Generation Partnership Project). Therefore, the user equipment is informed about an incoming call by help of a paging indication. In case of an incoming call the network can page the user equipment, whereby the information relates to the call only at a well defined instance, i.e. once per DRX cycle. This implies that user equipments need to monitor the paging indication once per DRX cycle. As E-UTRAN fully employs packet switching technology, it requires efficient paging mechanisms since the packet arrival (i.e. incoming calls) is bursty.

According to current solutions the paging is sent in the centre of the transmission bandwidth. This solution works well for user equipments having a bandwidth that is the same as the cell transmission bandwidth. However, in some E-UTRAN scenarios the bandwidth of the user equipment is smaller than the network bandwidth. For such scenarios a user equipment must retune its receiver each time it needs to listen to the paging. Further, current solutions also lead to less flexibility in terms of resource allocation from the network perspective.

SUMMARY OF INVENTION

It is thus perceived to be a problem to achieve a dynamic allocation of resources for paging that is applicable also in scenarios where the bandwidth of a user equipment is smaller than the network bandwidth and where the user equipment only can use limited positions in the frequency domain.

It is therefore the basic idea of the present invention to achieve a method and arrangement in a user equipment operating with a bandwidth that is smaller than its cell transmission bandwidth, said method including the steps of indicating its paging position in the frequency domain to the network; receiving paging information, or an appropriate message within the UE reception bandwidth, from the network; changing, if indicated by the network, its paging position within the cell transmission bandwidth. The method may further include the steps of receiving and applying selection probabilities for different possible paging positions within the cell transmission bandwidth that are broadcasted by the network in order to ensure for a cell an even distribution of user equipments in the frequency domain.

According to a second aspect of the present invention, there is also provided a method in a network unit, the method comprising the step of positioning a user equipment at a particular position in the frequency domain for receiving paging when the user equipment is in idle mode or any other low activity state.

According to third and fourth aspects of the present invention, a user equipment and a network unit are provided for performing the methods of the first and second aspects, respectively, as outlined above.

The present invention implies the advantage to ensure an equal distribution in the frequency domain of paging positions of user equipments within the cell transmission bandwidth.

It is a further advantage of the present invention that it ensures an efficient usage of resources by preventing the need of sending multiple copies of paging indications and paging messages.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
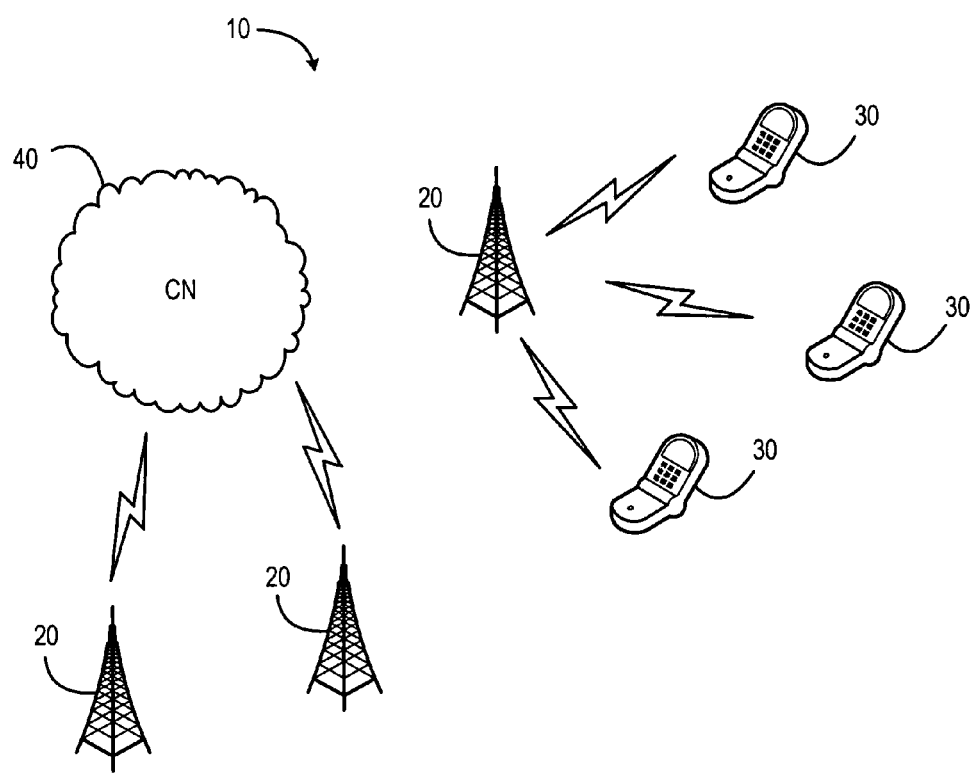
FIG. 1 shows a cellular radio communication network.

FIG. 1 shows a cellular radio communication network 10. The network 10 comprises a plurality of network units 20, each of which transmits communications to a separate cell in the network 10. Network units 20 are also referred to as base stations in the following description. Within each cell, user equipments (UEs) 30 receive transmissions from the respective network unit 20. Each of the network units 20 receive information from a core network (CN) 40, which controls the operation of the network 10.

Figure 2:
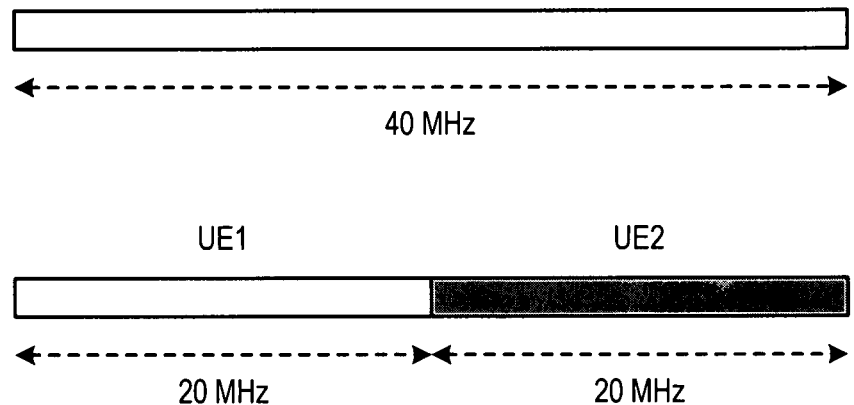
FIG. 2 illustrates an example of locations in the frequency domain of a 20 MHz UE in a 40 MHz cell transmission bandwidth.

The present invention relates to the scheduling of paging indications and paging messages to user equipments having a bandwidth that is smaller than the cell transmission bandwidth. The user equipment shall be positioned in the frequency domain at limited positions. By means of a non-limiting example, which is applied in the following description, in E-UTRAN the minimum UE bandwidth capability is 20 MHz and the maximum cell bandwidth in future will be larger than 20 MHz. Hence, as an example, in E-UTRAN a 20 MHz user equipment within a 40 MHz cell bandwidth shall be placed at a limited number of positions (e.g. two or three positions). For this purpose the user equipment tunes its receiver to a specific position in the frequency domain within a cell. FIG. 2 shows an example of 20 MHz UE with two different positions in the frequency domain: lower (left) 20 MHz or upper 20 MHz (right).

Figure 3:
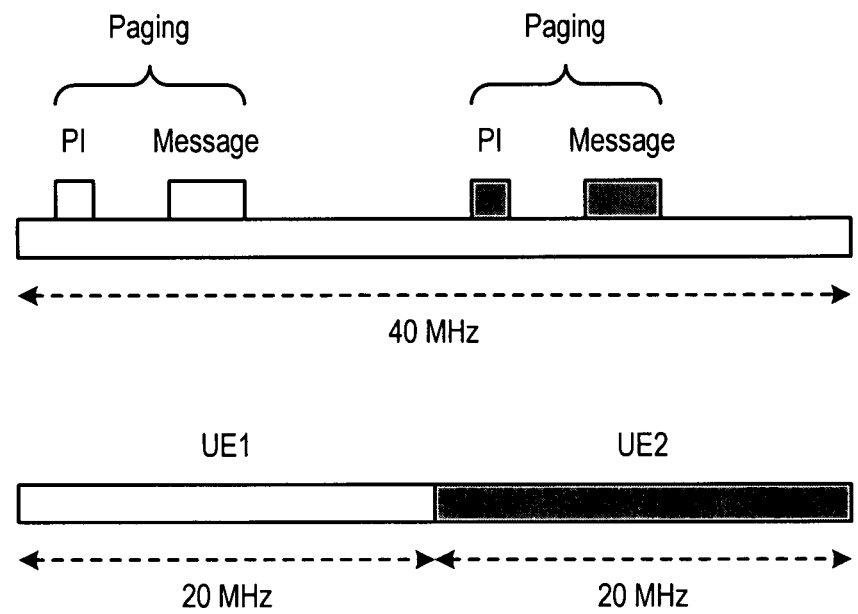
FIG. 3 shows an example of paging of a 20 MHz UE in a 40 MHz cell transmission bandwidth.

Regarding paging transmission, both the paging indicator and the paging message are sent within the UE reception bandwidth without any duplication (the paging can be sent at any position in the frequency domain within the UE reception bandwidth). Since the user equipment is paged within its reception bandwidth it is prevented that the user equipment needs to re-tune its receiver. FIG. 3 shows the transmission of paging in case of two UE positions.

Alternatively, if the paging is duplicated, or multiple pagings are sent in case of more than two UE positions, the user equipment would be allowed to receive the paging irrespective of its position and without the need for any re-tuning of its receiver. In order to allow the above solution to work the network needs to be aware of the current paging position of the user equipment within the cell transmission bandwidth, which is larger than the UE bandwidth. In a first step the user equipment needs to be positioned at a certain paging position.

The following discloses by means of non-limiting examples several embodiments to position a user equipment:

According to one embodiment for positioning of a user equipment in the frequency domain, a certain positioning rule is applied, e.g. a probabilistic or a hash-based rule.

1) When applying, for instance, a probabilistic rule, the user equipment selects its paging position out of a number N of possible positions with a certain probability that is associated to each position. Thus, a position that is denoted with a positioning index $k \epsilon [0, 1, \ldots N-1]$ is selected by the user equipment with a probability $P_k$. In a special case the probabilities for all positions are the same, i.e. $P_0 = P_1 = \ldots P_{N-1} = 1/N$. In case of two UE positions, the above special case would imply that statistically half of the user equipments are positioned on the lower half of the spectrum and half of the user equipments are positioned on the upper half of the spectrum.

2) Another conceivable positioning rule is a hash rule that is based on a suitable hash function. In this rule user equipments are positioned in the frequency domain according to their identities (ID). Hashing of the UE identifier maps then the UE identity on one of the available positions. One simple example of hashing function is a modulus operation, whereby a user equipment is positioned in the frequency domain according to a UE-specific identifier (UE_ID). For instance, out of a number N of possible positions the user equipment can derive its positioning index k by using an operation k=(UE_ID) mod N. A UE-specific identifier is, e.g., the IMSI; however, any other well-defined UE-specific identity can be used.

In another hash-based rule, the groups of UE identities can be mapped onto paging positions. UE identities can be hashed onto paging groups (e.g. 32-bit UE_ID to 12 bit Paging Group ID) which are, in turn, deterministically distributed over the available paging positions.

According to another embodiment for positioning a user equipment in the frequency domain, the UE positioning can be performed either by a UE-based selection, i.e. the user equipment places itself independently at a certain position, or by a network-based selection. As the paging consumes a certain amount of resources it is beneficial to equally distribute the idle mode user equipments, i.e. those listening to the paging, within the different positions in the frequency domain. The network is fully aware of the radio resource situation and can therefore indicate in the system information (transmitted on the broadcast channel) the preferred paging positions where the user equipment shall tune itself. Depending on the type of information that is sent in the system information there are different possible ways to realize this mechanism, whereof the following discloses two non-limiting examples:

1) Well Defined Positions: The broadcasted information may comprise associations between the range of UE identities, or groups of UE identities, and the paging positions. The UE groups that are to be assigned to different paging positions can be decided on by help of their identities, subscription, intended services, or any other suitable criteria.

2) Broadcast Selection Probabilities: The system information may comprise selection probabilities for different paging positions. The probabilities could be changed dynamically owing to the radio resource usage in different locations. This method provides an increased flexibility. For instance, if needed, a non-uniform UE distribution can also be achieved by changing the access probabilities. This means that a user equipment shall automatically be placed at the paging position that is optimal from a resource usage view point. Thus, this allows preventing a resource bottleneck at the time of paging.

Figure 4:
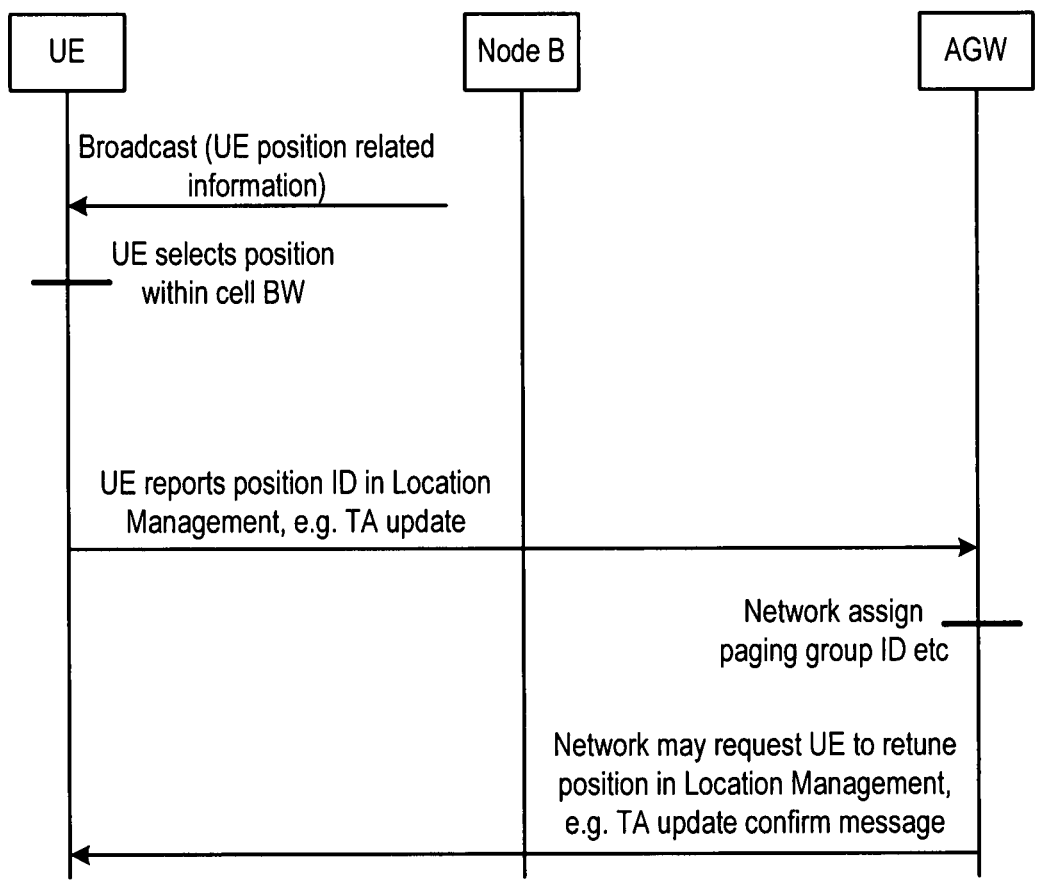
FIG. 4 illustrates the signalling for indicating and negotiating UE positions within the cell bandwidth.

After having retrieved a paging position for the user equipment in the frequency band, it is necessary to report the paging positions. The user equipment (in idle mode) selects a suitable paging position, e.g. by using any of the methods described above. Subsequently, the user equipment then reports, depending on the used position selection method, its paging position to the network (except for hash based rules). This is necessary because the network needs to know the frequency position at which the user equipment currently is camped before the network can send the page. The user equipment can indicate its paging position, e.g., in a location management message (e.g. tracking area update, cell update etc). The message may simply consist of an identity of the paging position, e.g. by applying an M-bit message to report $2^M$ positions. However, it must be observed that the user equipment can move within the coverage area and, thus, may camp on to a new cell. Preferably, the user equipment shall maintain the same paging position at least in the same tracking area. However, in case the paging position of the user equipment within the cell bandwidth is different in the new cell compared to the old cell, the user equipment shall again indicate its new paging position the network. In response, the network shall send a paging indicator as well as a paging message to the new paging position in the frequency domain at which the user equipment is tuned. This means that user equipments in a particular paging position may be assigned the same group identity in case this group identity is used to address paging related information. The network also has the liberty to direct the user equipment to change its paging position. This could be done by sending the request to the user equipment in a location management message, e.g. tracking area update confirm, cell update confirm etc. The entire protocol operation is shown in FIG. 4. In said figure, the user equipment in idle mode or any low activity state receives a broadcast message 31 from the Node B with UE position-related information. The user equipment selects 32 its paging position within the cell transmission bandwidth and reports the paging position-ID in, e.g., a location management message 33. The network assigns 34 paging group ID and may request the user equipment to retune its paging position in a location management message 35.

The main benefit of the pre-defined rules is that the Core Network, e.g. the access gateway in E-UTRAN, does not need to inform the base station where to page the user equipment. It is already sufficient to inform the base station about the identity of the user equipment. If the base station has been supplied with the particular "rule", the base station can calculate itself at which paging position in the frequency domain the user equipment is camped. The base station will then send the paging for that particular user equipment at that particular paging position.

The applied "rule" should preferably not be hard-coded into the user equipment but rather be provided at the time when the user equipment attaches to the network. This allows to use the benefits of the usage of a network-controlled rule, e.g. to simplify an update of a hash function, which has turned out to have some bad properties. Secondly as stated earlier, this also provides a more flexible and efficient handling of the radio resources.

Although the above examples have mainly concentrated on a 40 MHz cell transmission bandwidth and a 20 MHz UE bandwidth, it will be appreciated by those skilled in the art that the present invention is equally applicable to any range of bandwidths and frequencies, as long as the UE bandwidth is smaller than the cell transmission bandwidth. One example is that of a 20 MHz bandwidth UE operating in a cell with 30 MHz bandwidth.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for a user equipment unit in a cellular radio communication network, said method comprising:
   selecting a paging position within a network bandwidth, wherein the user equipment receives paging indications from the network according to the paging position, the user equipment is operating using a reception bandwidth that is smaller than the network bandwidth, and the user equipment is monitoring for the paging indication while operating in at least one of idle mode or another low activity state; and
   changing the paging position to a second paging position based on an explicit indication sent by the network, the explicit indication being sent using a dedicated signaling message sent to the user equipment from the network.

2. The method according to claim 1, wherein the user equipment selects the paging position using one or more predefined rules.

3. The method according to claim 2, wherein the user equipment selects the paging position according to a rule related to predefined probabilities for each position.

4. The method according to claim 2, wherein the user equipment selects the paging position according to a rule related to a hash function.

5. The method according to claim 4, wherein the changing includes hashing an identity of the user equipment onto another paging position that is different from the selected paging position and that is available according to the hash function.

6. The method according to claim 4, wherein identities of plural user equipments including the user equipment are hashed onto a paging group and are assigned to different paging positions.

7. The method according to claim 1, wherein the user equipment selects the paging position according to received broadcast information.

8. The method according to claim 1, wherein the dedicated signaling message comprises one or more of a tracking area update confirm message or a cell update confirm message.

9. The method according to claim 1, wherein the user equipment selects the paging position according well-defined positions that are associations between user equipment identities and paging positions.

10. The method according to claim 1, further comprising reporting the selected paging position to the network during a location management after an initial cell selection.

11. The method according to claim 1, further comprising reporting the selected paging position to the network during a location management after a cell re-selection.

12. The method according to claim 1, further comprising:
   receiving the paging indication labeled according to an identity of the user equipment, from the network according to the paging position; and
   changing a state of the user equipment from the idle mode or the low activity state in response to the receiving.

13. A method for paging transmission, for use in a network unit of a cellular radio communication network comprising one or several user equipments operating with a bandwidth that is smaller than the network bandwidth, said method comprising:
   transmitting, to a user equipment, a paging indication according to a paging position selected by the user equipment that is within the network bandwidth, the paging indication being sent while the user equipment is in idle mode or another low activity state; and
   transmitting, to the user equipment, a dedicated signaling message that explicitly indicates a change to a second paging position to be used by the user equipment for subsequent paging indications.

14. The method of claim 13, further comprising:
   receiving the paging position from the user equipment.

15. The method of claim 13, further comprising:
   transmitting a paging message to the user equipment within the same reception bandwidth used for transmitting the paging indication.

16. The method according to claim 13, further comprising broadcasting selection probabilities to achieve a random distribution of the user equipments among different possible paging positions.

17. The method according to claim 13, further comprising:
   periodically requesting the user equipment to retune the paging position.

18. A user equipment for use in a cellular radio communication network, the user equipment being configured to:
   select a paging position within the network bandwidth, wherein the user equipment is configured to receive a paging indication from the network according to the paging position, the user equipment is configured to operate using a reception bandwidth that is smaller than the network bandwidth, and the user equipment is configured to monitor for the paging indication while operating in at least one of idle mode or another low activity state; and change the paging position of the user equipment to a second paging position based on an explicit indication sent by the network, the explicit indication being sent using a dedicated signaling message sent to the user equipment from the network.

19. A network unit, for use in a cellular radio communication network comprising one or more user equipments operating with a bandwidth that is smaller than a network bandwidth, said network unit being configured to:
    transmit a paging indication to a user equipment at a paging position selected by the user equipment that is within the network bandwidth, the paging indication being sent while the user equipment is in idle mode or another low activity state; and
    transmit, to the user equipment, a dedicated signaling message that explicitly indicates a change to a second paging position to be used by the user equipment for subsequent paging indications.

* * * * *